United States Patent [19]

Barraclough et al.

[11] 4,152,171

[45] May 1, 1979

[54] PREPARATION OF α- β- AND γ-COPPER PHTHALOCYANINE PIGMENTS

[75] Inventors: Ronald Barraclough, Jonstone; Robert Langley, Newton Mearns, both of Scotland

[73] Assignee: Ciba-Geigy Corporation, Ardsley, N.Y.

[21] Appl. No.: 872,300

[22] Filed: Jan. 25, 1978

Related U.S. Application Data

[63] Continuation of Ser. No. 716,414, Aug. 23, 1976, abandoned.

[30] Foreign Application Priority Data

Aug. 21, 1975 [GB] United Kingdom ............... 34707/75

[51] Int. Cl.$^2$ ...................... C08H 17/04; C09B 47/04
[52] U.S. Cl. ............................. 106/288 Q; 260/314.5
[58] Field of Search ................... 106/288 Q; 260/314.5

[56] References Cited

U.S. PATENT DOCUMENTS

| | | | |
|---|---|---|---|
| 3,615,805 | 10/1971 | Ehrich et al. | 106/288 Q |
| 3,763,182 | 10/1973 | Horiguchi et al. | 106/288 Q |
| 3,897,450 | 7/1975 | Horiguchi et al. | 260/314.5 |
| 4,039,346 | 8/1977 | Kranz | 106/288 Q |

FOREIGN PATENT DOCUMENTS

| | | | |
|---|---|---|---|
| 764388 | 8/1971 | Belgium | 106/288 Q |
| 40-4144 | 3/1965 | Japan | 106/288 Q |
| 83726 | 8/1974 | Japan | 106/288 Q |

OTHER PUBLICATIONS

Chem. Abstracts, 83, item 12209b, (1975).
Chem. Abstracts, 73, item 46672f, (1970).

*Primary Examiner*—Helen McCarthy
*Attorney, Agent, or Firm*—Vincent J. Cavalieri; Joseph F. DiPrima

[57] ABSTRACT

A process for the production of alpha-, beta-, and gamma-copper phthalocyanine pigments by reacting an aromatic or aromatic heterocyclic ortho-dinitrile compound and copper or a copper compound capable of providing the centrol metal atom of a phthalocyanine pigment at a temperature below 100° C. in the presence of a alkaline substance in a hydrophilic aliphatic organic solvent containing one or more hydroxy groups and adding as catalyst or crystal form controller or both from the beginning of the reaction:

(a) for alpha-, beta- or gamma pigments, a copper phthalocyanine in conventional pigmentary form or (b) for alpha pigments, a copper phthalocyanine derivative with a limited degree of substitution.

7 Claims, No Drawings

PREPARATION OF α- β- AND γ-COPPER PHTHALOCYANINE PIGMENTS

This is a continuation of application Ser. No. 716,414, filed on Aug. 23, 1976, now abandoned.

The present invention relates to the direct preparation of pigmentary phthalocyananes.

It is known that copper phthalocyanines can be prepared in which a metal phthalocyanine in conventional pigmentary form is added to the reaction mixture during synthesis, (a) as a catalyst for increasing the rate of phthalocyanine formation and to obtain increased yields and
(b) as a seed to obtain a particular crystal form of the copper phthalocyanine.

The addition of metal phthalocyanine derivatives during synthesis as crystal growth inhibitors is also known.

However the processes described in patent literature in which a metal phthalocyanine in conventional pigmentary form is added during synthesis take place above 100° C.

Japanese Patent Publication No. 83726/1974 describes the preparation of solvent stable copper phthalocyanine pigments, characterized as the reaction of a phthalodinitrile or indolenine compound with copper or a compound thereof at a temperature of not more than 100° C. in a hydrophilic organic solvent in the presence of an alkaline substance and milled copper phthalocyanine of average particle diameter not more than 10 mμ, the individual particles of which have a surface in the solvent-unstable form while the centre contains a nucleus of solvent-stable form.

We have found, surprisingly, that by adding a copper phthaolocyanine in conventional pigmentary form or a copper phthalocyanine derivative with a limited degree of substitution from the beginning of the reaction at a temperature below 100° C. in a process for the preparation of alpha-, beta- or gamma-phthalocyanine it acts as a catalyst or crystal form controller or both and much better yield is obtained. High quality pigments are obtained without the need for acid-pasting or mechanical pulverisation.

According to the present invention there is provided a process for the production of alpha-, beta-, and gamma-copper phthalocyanine pigments which comprises reacting an ortho-dinitrile compound of the general formula

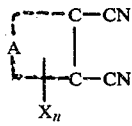

in which A forms an aryl or aromatic heterocyclic radical, X is a hydrogen or halogen atom or a nitro, amino, sulphonic acid, carboxylic acid, alkyl or alkoxy group and n is an integer from 1 to 4; and copper or a copper compound capable of providing the central metal atom of a phthalocyanine pigment at a temperature below 100° C. in the oresence of an alkaline substance which is a hydroxide, oxide, peroxide, alkoxide or carbonate of an alkali metal or of an alkaline earth metal in a hydrophilic aliphatic organic solvent containing one or more hydroxy groups and adding as a catalyst or crystal form controller or both from the beginning of the reaction:

(a) for alpha-, beta- or gamma pigments, a copper phthalocyanine in conventional pigmentary form or
(b) for alpha-pigments, a copper phthalocyanine derivative with a limited degree of substitution.

Examples of the dinitriles are: aromatic dinitrile compounds such as phthalodinitrile, halogenated dinitrile compounds such as mono-, di-, tri or tetra-chlorophthalodinitrile and mono-, di-, tri- or tetra-bromophthalo-dinitrile, sulphonic acid-substituted phthalodinitrile compounds; carboxylic acid-substituted phthalodinitrile compounds such as carboxylic acid phthalodinitrile: nitro-substituted phthalodinitrile compounds; amino-substituted phthalodinitrile compounds; alkyl-substituted phthalodinitrile compounds such as methyl phthalodinitrile and ethyl phthalodinitrile; alkoxy or aryloxy phthalodinitrile compounds such as methoxy phthalodinitrile, phenoxy phthalodinitrile and ethoxy phthalodinitrile; and heterocyclic dinitrile compounds such as 2,3-dicyano pyridine. The dinitrile compounds may be used in admixture.

Copper compounds that may be used in the present invention include, for example, cuprous oxide, cupric oxide, cuprous bromide, cupric bromide, copper sulphate, copper hydroxide and preferably cuprous chloride, cupric chloride and copper acetate. If copper is used it may be used as copper powder.

The copper or copper compound is preferably used in an amount of one or more moles per four moles of the dinitrile compound.

Examples of alkaline materials which may be used in the present invention are sodium oxide, sodium peroxide, sodium carbonate, potassium oxide, potassium peroxide, potassium hydroxide, potassium methoxide, potassium carbonate, magnesium oxide, magnesium hydroxide, calcium oxide, calcium peroxide, calcium hydroxide, barium oxide, barium hydroxide and preferably sodium metal, sodium methoxide and sodium hydroxide.

The alkaline material serves to maintain the reaction system in the alkaline state and to allow the reaction to proceed smoothly.

The alkaline materials are suitably used in an amount of up to 2 moles per mole of dinitrile, but the amount of alkaline substance may vary depending upon the copper salt used and the valency of the metal of the alkaline substance. For example, when sodium hydroxide is used, if the copper is monovalent it is preferred to use from 0.25 to 0.5 moles of NaOH per mole of the dinitrile compound and when the copper is divalent it is preferred to use from 0.5 to 0.75 moles of NaOH per mole of the dinitrile compound.

Hydrophilic aliphatic solvents containing a hydroxyl group which may be used in the process of the invention include, for example, monohydric or polyhydric hydrophilic alcohols such as propanol, isopropanol, n-butanol, isobutanol, secondary butanol, t-butanol and ethylene glycol, preferably methanol and ethanol; hydrophilic Cellosolves ("Cellosolve" is a Registered Trade Mark) such as methyl Cellosolve, ethyl Cellosolve and diethylene glycol ethyl ether. These solvents can be used alone or in admixture.

The solvents may be used in any desired amount provided that the reaction proceeds smoothly. Usually, the solvent will be used in amounts of from 2.0 to 15 times the amount of dinitrile compound.

When the catalyst and/or crystal form controller added from the beginning of the reaction is a copper phthalocyanine in conventional pigmentary form, it may be alpha-, beta-, or gamma depending on the type of pigment required. The amount of copper phthalocyanine used may vary from 0.5% to 200% by weight based on the weight of pigment synthesized depending on whether an alpha-, beta-, or gamma-pigment is required. In the preparation of an alpha-, or gamma-phthalocyanine, the amount of alpha- or gamma-phthalocyanine added may be from 0.5% to 40% by weight and preferably from 0.5% to 20% by weight for alpha-pigments and from 20% to 40% by weight for gamma-pigments based on the weight of pigment synthesized. However, in the preparation of beta-copper phthalocyanine the amount of beta copper phthalocyanine added as a crystal form controller/catalyst may be at least 40% and preferably at least 51% by weight based on the weight of pigment synthesized and especially from 100% to 150%. By using such amounts a 100% beta pigment can be prepared directly in a one-step process. If the quantity of beta copper phthalocyanine added during synthesis is less than 40% by weight, gamma/beta mixtures are obtained instead of a 100% beta pigment. The gamma/beta mixtures are converted to a 100% beta-pigment by a subsequent acid-treatment or treatment with a suitable aromatic organic solvent such as toluene, xylene or diethylaniline.

When the catalyst and/or crystal form controller added from the beginning of the reaction in the preparation of alpha pigments is a copper phthalocyanine derivative with a limited degree of substitution, the degree of substitution of the copper phthalocyanine derivative should be such that the substituents do not interfere substantially with the mechanism of the reaction and preferably not more than 4 hydrogen atoms are replaced by other groups such as chloride, hydroxy or phenoxy.

The amount of copper phthalocyanine derivative may vary from 0.5% to 10% by weight, preferably from 1% to 7% by weight, based on the weight of alpha pigment synthesised. The copper phthalocyanine derivative may also act as a stabiliser for the alpha pigmentary form and also as a crystal growth inhibitor.

Examples of copper phthalocyanine derivatives are:

(i) chlorinated copper phthalocyanines e.g. mono-, di, tri, and tetrachloro copper phthalocyanine.
(ii) copper phthalocyanine sulphonic acids e.g. CuPc (SO$_3$H)n (where n = 1 to 4)
(iii) CuPc$\underset{(SO_3H)_2}{\overset{(SO_2NH \cdot CH_2CH_2OH)_2}{<}}$
(iv) 1,2,4-trichloro-3-phenoxy copper phthalocyanine.

A further embodiment of the invention is to use one or more organic or inorganic ammonium salts in addition to the alkaline substance. Examples of suitable inorganic and organic ammonium salts are ammonium chloride, ammonium sulphate, ammonium persulphate, ammonium orthophosphate, ammonium metaphosphate, ammonium pyrophosphate, ammonium carbonate, ammonium bicarbonate, ammonium formate, ammonium acetate, and ammonium oxalate. The ammonium salts are suitably used in an amount of from 0.1 to 10% by weight, preferably from 0.5 to 6% by weight, based on the dinitrile compound.

It has also been found advantageous to use a reducing agent such as sodium hydrosulphite and/or a nitrogen containing base such as pyridine.

When the catalyst and/or crystal form controller added from the beginning of the reaction is a copper phthalocyanine in the conventional pigmentary form, if desired there may also be added a metal phthalocyanine other than copper phthalocyanine or a metal phthalocyanine derivative which suppresses crystal growth and also in the case of the alpha pigments achieves stability. Examples of metal phthalocyanine derivatives that may be used are those which may be added from the beginning of the reaction for the preparation of alpha pigments, as illustrated above.

The amount of phthalocyanine derivative added when used as a crystal growth inhibitor and added in addition to a catalyst and/or crystal form controller in conventional pigmentary form may be from 1% to 20% by weight, preferably 1% to 10% by weight based on the weight of pigment synthesised. The metal phthalocyanine derivative may be added at any time during or after synthesis or may be prepared in situ at the same time as the copper phthalocyanine pigment.

The condensation reaction of the present invention is carried out at a temperature below 100° C. and the actual temperature may vary accoring to the solvent used. However, particularly, a temperature of about 70° C. gives good results.

After completion of the reaction, a pigment having a clean shade and a high colour strength may be obtained even by immediate filtration, water washing and drying of the reaction product. The pigment may be further treated with a dilute aqueous acid and/or a dilute aqueous alkali prior to the filtration and drying, if necessary.

The copper phthalocyanine pigments thus prepared exhibit high colour strength and clean hue and the pigments do not require a particle size reduction step as is the case with pigments synthesized by conventional methods.

If a compound such as dimethylglyoxime which can form a complex with the copper salt used in the reaction is added to the reaction mixture in any of the previous described embodiments of the invention, a phthalocyanine pigment can be produced in a higher yield.

It has also been found, in accordance with another embodiment of the invention, that, when using a hydrophilic organic solvent, if a small amount of an acid is added, followed by stirring, immediately after completion of the reaction without isolation of the pigment, a pigment with improved texture is obtained.

Acids which may be used include inorganic acids such as hydrochloric acid, sulphuric acid, phosphoric acid; and organic acids such as acetic acid, propionic acid and oxalic acid.

When the acid is added to a stabilised alpha-pigment or a beta-pigment, the amount of the acid used will vary somewhat depending on the nature of the hydrophilic organic solvent but it will usually be used in an amount of from 0.5 to 75% by weight, preferably from 3 to 50% by weight based on the hydrophilic organic solvent. This amount corresponds to about 0.015 to 2 times the amount of pigment formed and the process is commercially advantageous in that such a small amount of the acid is sufficient.

When the acid is added to a suspension of an unstabilised alpha-pigment the amount of strong mineral acid used, e.g. 98% sulphuric acid or concentrated phosphoric acid, preferably does not exceed 30% by weight based on the weight of solvent and the amount of organic acid does not exceed 40% by weight based on the weight of solvent.

The acid is suitably added dropwise, and after completion of the acid reaction the mixture may be filtered, washed and dried to obtain a pigment. If necessary the reaction mixture can be further treated with a dilute alkaline aqueous solution after filtration. The acid can be sufficiently removed from the pigment by filtration and water-washing.

In another embodiment of the present invention, high-speed stirring may be employed at the beginning of the reaction and the duration may conveniently be up to 30 minutes. An example of a high-speed stirrer is a Silverson Mixer Model L2R capable of speeds of 6000 revolutions per minute. The actual speed used varies depending upon the nature and size of the experiment.

The following Examples 1 to 34 further illustrate the invention.

EXAMPLE 1

To 100 grams methanol were added 0.9 grams dimethylglyoxime. When a solution had been obtained 6.2 grams cuprous chloride were added and the mixture was stirred until complete solution was obtained (a dark brown complex formation). Then there was added:
- 32 grams phthalonitrile
- 3.0 grams ammonium chloride
- 3.0 grams beta copper phthalocyanine
- 1.0 gram 1,2,4-trichloro-3-phenoxy-copper phthalocyanine The mixture was stirred for 1 hour at room temperature, and then 5 grams of sodium hydroxide were added slowly and 1 gram of pyridine dissolved in 10 milliliters of methanol were added dropwise while adding the sodium hydroxide. The mixture was stirred for a further 30 minutes at room temperature after the last addition of sodium hydroxide and pyridine.

The mixture was then refluxed for 8 hours, allowed to cool to room temperature and then 60 grams of 98% sulphuric acid were added dropwise and stirred for 1 hour at room temperature. The mixture was then neutralised to pH 7 to 8 with aqueous sodium hydroxide followed by stirring for ½ hour at room temperature and then 30 milliliters of diethylaniline were added. The mixture was refluxed for 1½ hours when the product was 100% beta-phthalocyanine.

50% hydrochloric acid was then added at room temperature until the pH was 1 to 2 and the mixture stirred for ½ hour. The product was finally filtered, washed with methanol and then with hot dilute hydrochloric acid, then hot dilute sodium hydroxide and dried at 50° to 60° C. The yield was 36 grams.

EXAMPLE 2

A similar procedure to that described in Example 1 was followed except that an alpha phthalocyanine was used instead of beta phthalocyanine as the seed and after the 8 hour reflux and allowing to cool to room temperature 60 grams of 98% sulphuric acid was added dropwise and the mixture stirred for 1 hour at room temperature and then refluxed for half an hour. The mixture was finally filtered, washed with methanol, hot dilute hydrochloric acid and hot dilute sodium hydroxide before drying at 50°-60° C. The yield was 36 g. of pigmentary alpha copper phthalocyanine.

EXAMPLE 3

0.9 grams dimethylglyoxime were added to 350 milliliters of methanol and when a solution had been obtained, 6.2 grams of cuprous chloride were added and the mixture stirred till the dark brown complex formation is complete. There was then added:
- 32 grams phthalonitrile
- 3.0 grams ammonium chloride
- 45 grams beta copper phthalocyanine
- 1 gram 1,2,4-trichloro-3-phenoxy-copper phthalocyanine The mixture was stirred for 1 hour at room temperature and then 4 grams of sodium metal was added slowly over 40 minutes together with 1 gram of pyridine dissolved in 10 milliliters methanol dropwise. The mixture was stirred for ½ hour at room temperature after the last addition of sodium and pyridine.

The mixture was refluxed for 8 hours and finally filtered, washed with methanol and then with hot dilute sodium hydroxide. After washing with water and then stirring for 1 hour at 90°–95° C. in dilute aqueous hydrochloric acid, the product was filtered, washed neutral and dried at 50°–60° C. The yield was 77 g of pigmentary β-copper phthalocyanine.

COMPARATIVE EXAMPLE A

To 100 grams CH₃OH add:
- 32 grams phthalonitrile (95% pure)
- 4.5 grams NaOH
- 2 grams Na₂CO₃

Stir at room temperature to obtain a solution or fine dispersion. Then add:
- 1 gram ammonium chloride
- 2 grams ammonium phosphate
- 8.4 grams cupric chloride Stir 1 hour, at room temperature and then reflux 10 hours. Filter, wash with methanol, hot dil., HCl and hot dil., NaOH. Wash neutral and dry at 50°-60° C. The yield was 19.4 grams.

COMPARATIVE EXAMPLE B

To 100 grams CH₃OH add:
- 32 grams phthalonitrile (95% pure)
- 6.2 grams cuprous chloride
- 3.0 grams ammonium chloride Stir 1 hour, at room temperature and the add:
- 5 grams NaOH slowly and stir for 10 mins.

Then add:
- 0.9 grams dimethyl glyoxime

Stir ½ hour at room temperature and then reflux 8 hours. Filter, wash with methanol, hot dilute HCl and hot dilute NaOH. Wash neutral and dry at 50°-60° C. The yield was 22 grams.

EXAMPLE 4

To 100 grams CH₃OH add:
- 32 grams phthalonitrile (95% pure)
- 6.2 grams cuprous chloride
- 3.0 grams ammonium chloride
- 1 gram unsubstituted pigmentary copper phthalocyanine Stir 1 hour at room temperature and then add:
- 5 grams NaOH slowly and stir for 10 minutes.

Then add:
- 0.9 grams dimethylglyoxime

Stir ½ hour at room temperature and then reflux for 8 hours. Filter, wash with methanol, hot dilute HCl and hot dilute NaOH. Wash neutral and dry at 50°–60° C. The yield was 32 grams.

EXAMPLE 5

To 140 grams CH₃OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
1 gram pigmentary beta-copper phthalocyanine.
Stir 1 hour at room temperature and then add:
2.9 grams sodium metal (slowly)
1 gram pyridine dissolved in 10 milliliters CH₃OH
The pyridine is added dropwise whilst adding the sodium metal. Stir ½ hour at room temperature after the last addition of sodium and pyridine. Finally reflux 8 hours. The pigment is isolated and purified in the manner of Example 4.

The yield was 31.5 grams of pigmentary gamma-copper phthalocyanine together with a trace of beta-copper phthalocyanine which is equivalent to the pigmentary beta-copper phthalocyanine added during synthesis.

EXAMPLE 6

To 140 grams CH₃OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
12.4 grams pigmentary gamma-copper phthalocyanine
Stir 1 hour at room temperature and then add:
2.9 grams sodium metal (slowly)
1 gram pyridine dissolved in 10 milliliters CH₃OH
The pyridine is added dropwise whilst adding the sodium metal. Stir ½ hour at room temperature after the last addition of sodium and pyridine. Finally reflux 8 hours. The pigment is isolated and purified in the manner of Example 4. The yield was 43.4 grams of pigmentary gamma-copper phthalocyanine.

EXAMPLE 7

To 100 grams CH₃OH add:
32 grams phthalonitrile (95% pure)
6.2 grams cuprous chloride
3.0 grams ammonium chloride
1 gram of a copper phthalocyanine derivative having the following formula:

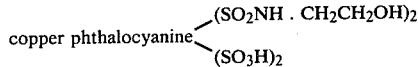

Stir 1 hour at room temperature and then add:
5 grams NaOH, slowly
1 gram pyridine dissolved in 10 milliliters CH₃OH
The pyridine is added dropwise whilst adding the NaOH. Stir ½ hour at room temperature after the last addition of NaOH and pyridine.
Then add:
0.9 grams dimethylglyoxime
Stir 15 minutes at room temperature and finally reflux 8 hours. The pigment is isolated by filtration and then washed with CH₃OH. The press-cake is re-slurried in 1–2% aqueous HCl and stirred at 90°–95° C. for 1 hour. The pigment is then filtered and washed neutral. This process is repeated using 1–2% aqueous NaOH. After washing neutral, the pigment is dried at 50°–60° C. The yield was 30 grams of pigmentary alpha-copper phthalocyanine.

EXAMPLE 8

To 100 grams CH₃OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
1 gram

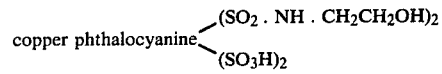

Stir 1 hour at room temperature and then add:
2.9 grams sodium metal, slowly
1 gram pyridine dissolved in 10 milliliters CH₃OH.
The pyridine is added dropwise whilst adding the sodium metal. Stir ½ hour at room temperature, after the last addition of sodium and pyridine. Finally reflux 8 hours.
Allow to cool to room temperature and then add:
12 grams concentrated (98%) H₂SO₄, dropwise
Stir 1 hour at room temperature and then reflux 1 hour. Filter, wash with methanol and then wash neutral with water. The press-cake is re-slurried in 1–2% aqueous NaOH and stirred at 90°–95° C. for 1 hour. Finally filter, wash neutral and dry at 50°–60° C. The yield was 31 grams of pigmentary alpha-copper phthalocyanine.

EXAMPLE 9

To 100 grams CH₃OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
1 gram

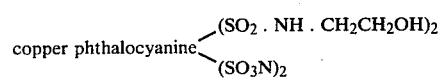

Stir 1 hour at room temperature and then add:
2.9 grams sodium metal, slowly
1 gram pyridine dissolved in 10 milliliters CH₃OH
The pyridine is added dropwise whilst adding the sodium metal. Stir ½ hour at room temperature after the last addition of sodium and pyridine. Finally reflux 8 hours. Allow to cool to room temperature and then add:
30 grams concentrated (98%) H₂SO₄, dropwise
Stir 1 hour at room temperature and then reflux 1 hour. The product is isolated and after-treated (purified)

in the manner of Example 8. The yield was 31 grams of pigmentary alpha-copper phthalocyanine.

EXAMPLE 10

To 100 grams CH$_3$OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
1 gram copper phthalocyanine dyestuff of the formula:

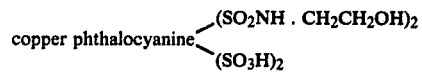

Stir 1 hour at room temperature and then add:
2.9 grams sodium metal, slowly
1 gram pyridine dissolved in 10 milliliters CH$_3$OH
The pyridine is added dropwise whilst adding the sodium metal. Stir ½ hour at room temperature after the last addition of sodium and pyridine. Finally reflux 8 hours. Allow to cool to room temperature and then add:
60 grams concentrated (98%) H$_2$SO$_4$, dropwise
Stir 1 hour at room temperature and then reflux ½ hour. The pigment is isolated and purified in the manner of Example 8. The yield was 31 grams of pigmentary alpha-copper phthalocyanine.

EXAMPLE 11

To 100 grams CH$_3$OH add:
32 grams phthalonitrile (95% pure)
6.2 grams cuprous chloride
3.0 grams ammonium chloride
1 gram 1,2,4-trichloro-3-phenoxy-copper phthalocyanine
Stir 1 hour at room temperature, then add:
5 grams NaOH, slowly
1 gram pyridine dissolved in 10 milliliters CH$_3$OH
The pyridine is added dropwise whilst adding the NaOH. Stir ½ hour after the last addition of NaOH and pyridine, then add:
0.9 grams dimethylglyoxime
Stir 15 minutes at room temperature and then reflux 8 hours. The product is isolated and purified in the manner of Example 7. The yield was 31 grams of pigmentary alpha-copper phthalocyanine.

EXAMPLE 12

To 100 grams CH$_3$OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
1 gram 1,2,4-trichloro-3-phenoxy-copper phthalocyanine
Stir 1 hour at room temperature and then add:
2.9 grams sodium metal, slowly
1 gram pyridine dissolved in 10 milliliters CH$_3$OH
The pyridine is added dropwise whilst adding the sodium metal. Stir ½ hour at room temperature after the last addition of sodium and pyridine. Finally reflux 8 hours. Allow to cool to room temperature and then add:
12 grams concentrated (98%) H$_2$SO$_4$, dropwise
Stir 1 hour at room temperature and then reflux 1 hour. The pigment is isolated and purified in the manner of Example 8. The yield was 31 grams of pigmentary alpha-copper phthalocyanine.

EXAMPLE 13

To 100 grams CH$_3$OH add:
0.9 grams dimethylglyoxime
When a solution has been obtained, add:
6.2 grams cuprous chloride
Stir till the dark brown complex formation is complete and then add:
32 grams phthalonitrile (95% pure)
3.0 grams ammonium chloride
1 gram 1,2,4-trichloro-3-phenoxy-copper phthalocyanine
Stir 1 hour at room temperature and then add:
2.9 grams sodium metal, slowly
1 gram pyridine dissolved in 10 milliliters CH$_3$OH
The pyridine is added dropwise, whilst adding the sodium metal. Stir ½ hour at room temperature, after the last addition of sodium and pyridine. Finally reflux 8 hours. Allow to cool to room temperature and then add:
30 grams concentrated (98%) H$_2$SO$_4$, dropwise
Stir 1 hour at room temperature and then reflux 1 hour. The pigment is isolated and purified in the manner of Example 8. The yield was 31 grams of pigmentary alpha-copper phthalocyanine.

EXAMPLE 14

To 100 grams CH$_3$OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
1 gram 1,2,4-trichloro-3-phenoxy-copper phthalocyanine
Stir 1 hour at room temperature and then add:
2.9 grams sodium metal, slowly
1 gram pyridine dissolved in 10 milliliters CH$_3$OH
The pyridine is added dropwise, whilst adding the sodium metal. Stir ½ hour at room temperature after the last addition of sodium and pyridine. Finally reflux 8 hours.
Allow to cool to room temperature and then add:
60 grams concentrated (98%) H$_2$SO$_4$, dropwise
Stir 1 hour at room temperature and then reflux ½ hour.
The pigment is isolated and after-treated (purified) in the manner of Example 8. The yield was 31 grams of pigmentary alpha-copper phthalocyanine.

EXAMPLE 15

To 100 grams CH$_3$OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride 1 gram unsubstituted pigmentary alpha-copper phthalocyanine
Stir 1 hour at room temperature and then add:
2.9 grams sodium metal, slowly
1 gram pyridine dissolved in 10 milliliters CH$_3$OH
The pyridine is added dropwise whilst adding the sodium metal. Stir ½ hour at room temperature after the last addition of sodium and pyridine. Finally reflux 8 hours. The pigment is isolated and purified in the manner of Example 7. The yield was 32 grams of pigmentary alpha-copper phthalocyanine.

EXAMPLE 16

To 120 grams CH$_3$OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
1 gram 1,2,4-trichloro-3-phenoxy-copper phthalocyanine
Stir 1 hour at room temperature and then add:
2.9 grams sodium metal, slowly
1 gram pyridine dissolved in 10 milliliters CH$_3$OH
The pyridine is added dropwise whilst adding the sodium metal. Stir ½ hour at room temperature after the last addition of sodium and pyridine. Finally reflux 8 hours. Allow to cool to room temperature and then add:
100 grams acetic acid, dropwise
Stir 1 hour at room temperature and then reflux 2 hours. The pigment is isolated and purified in the manner of Example 8. The yield was 31 grams pigmentary alpha-copper phthalocyanine.

EXAMPLE 17

To 100 grams CH$_3$OH add:
32 grams phthalonitrile (95% pure)
6.2 grams cuprous chloride
3.0 grams ammonium chloride
1 gram pigmentary beta-copper phthalocyanine
Stir 1 hour at room temperature and then add:
5 grams NaOH slowly
1 gram pyridine dissolved in 10 milliliters CH$_3$OH
The pyridine is added dropwise whilst adding the NaOH.
Stir ½ hour at room temperature after the last addition of NaOH and pyridine. Then add:
0.9 grams dimethylglyoxime
Stir 15 minutes at room temperature and then reflux 7-8 hours. Allow to cool to room temperature and then add:
60 grams concentrated (98%) H$_2$SO$_4$, dropwise
Stir 1 hour at room temperature and then reflux till 100% beta is obtained. This normally takes ½ hour to 1 hour. The pigment is isolated in the manner of Example 8. The yield was 32 grams of beta-copper phthalocyanine.

EXAMPLE 18

To 100 grams CH$_3$OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
6 grams pigmentary beta-copper phthalocyanine
Stir 1 hour at room temperature and then add:
2.9 grams sodium metal, slowly
1 gram pyridine dissolved in 10 milliliters CH$_3$OH
The pyridine is added dropwise whilst adding the sodium metal. Stir ½ hour at room temperature, after the last addition of sodium and pyridine. Finally reflux 8 hours. Allow to cool to room temperature and then add:
24 grams 98% H$_2$SO$_4$, dropwise
Stir 1 hour at room temperature and then neutralise with NaOH till pH=7 to 8. Add extra methanol if required. Finally reflux, till 100% beta is obtained. The pigment is isolated and purified in the manner of Example 7. The yield was 37 grams of pigmentary beta-copper phthalocyanine.

EXAMPLE 19

To 280 grams CH$_3$OH add:
0.9 grams dimethylglyoxime
When a solution has been obtained, add:
6.2 grams cuprous chloride
Stir till the dark brown complex formation is complete and then add:
32 grams phthalonitrile (95% pure)
3.0 grams ammonium chloride
45 grams pigmentary beta-copper phthalocyanine
Stir 1 hour at room temperature and then add:
4 grams sodium metal, slowly
1 gram pyridine dissolved in 10 milliliters CH$_3$OH
The pyridine is added dropwise whilst adding the sodium metal. Stir ½ hour at room temperature after the last addition of sodium and pyridine. Finally reflux 8 hours. The pigment is isolated and after-treated (purified) in the manner of Example 7. The yield was 76 grams of pigmentary beta-copper phthalocyanine.

EXAMPLE 20

To 280 grams CH$_3$OH add:
0.9 grams dimethylglyoxime
When a solution has been obtained, add:
6.2 grams cuprous chloride
Stir till the dark brown complex formation is complete and then add:
32 grams phthalonitrile (95% pure)
3.0 grams ammonium chloride
45 grams pigmentary beta-copper phthalocyanine
Stir 1 hour at room temperature and then add:
4 grams sodium metal, slowly
1 gram pyridine dissolved in 10 milliliters CH$_3$OH
The pyridine is added dropwise, whilst adding the sodium metal. Stir ½ hour at room temperature after the last addition of sodium and pyridine. Finally reflux 8 hours. Allow to cool to room temperature and then add:
60 grams concentrated (98%) H$_2$SO$_4$, dropwise
Stir 2 hours at room temperature and then isolate and purify in the manner of Example 8. The yield was 76 grams of pigmentary beta-copper phthalocyanine.

EXAMPLE 21

To 240 grams CH$_3$OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride 30 grams pigmentary beta-copper phthalocyanine
Stir 1 hour at room temperature and then add:
4 grams sodium metal, slowly
1 gram pyridine dissolved in 10 milliliters CH₃OH The pyridine is added dropwise whilst adding the sodium metal. Stir ½ hour at room temperature after the last addition of sodium and pyridine. Finally reflux 8 hours. Allow to cool to room temperature and then add:
60 grams concentrated (98%) H₂SO₄, dropwise Stir 2 hours at room temperature. The pigment is isolated and purified in the manner of Example 8. The yield was 61 grams of pigmentary beta-copper phthalocyanine.

EXAMPLE 22

To 200 grams CH₃OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
18 grams pigmentary beta-copper phthalocyanine
Stir 1 hour at room temperature and then add:
4 grams sodium metal, slowly
1 gram pyridine dissolved in 10 milliliters CH₃OH The pyridine is added dropwise, whilst adding the sodium metal. Stir ½ hour at room temperature after the last addition of sodium and pyridine. Finally reflux 8 hours. Allow to cool to room temperature and then add:
60 grams concentrated (98%) H₂SO₄, dropwise Stir 2 hours at room temperature. The pigment is isolated and after-treated (purified) in the manner of Example 8. The yield was 49 grams of pigmentary beta-copper phthalocyanine.

EXAMPLE 23

To 160 grams CH₃OH add:
0.9 grams dimethylglyoxime
When a solution has been obtained add:
6.2 grams cuprous chloride
Stir till the dark brown complex formation is complete and then add:
32 grams phthalonitrile (95% pure)
3.0 grams ammonium chloride
12 grams pigmentary beta-copper phthalocyanine
Stir 1 hour at room temperature and then add:
3.5 grams sodium metal, slowly
1 gram pyridine dissolved in 10 milliliters CH₃OH The pyridine is added dropwise whilst adding the sodium metal. Stir ½ hour at room temperature, after the last addition of sodium and pyridine. Finally reflux 8 hours. Allow to cool to room temperature and then add:
60 grams concentrated (98%) H₂SO₄, dropwise Stir 2 hours at room temperature. The pigment is isolated and purified in the manner of Example 8. The yield was 43 grams of pigmentary beta-copper phthalocyanine.

EXAMPLE 24

To 1400 milliliters CH₃OH add:
3.6 grams dimethylglyoxime
When a solution has been obtained add:
24.8 grams cuprous chloride
Stir till the dark brown complex formation is complete and then add:
128 grams phthalonitrile (95% pure)
12.0 grams ammonium chloride
180 grams pigmentary beta-copper phthalocyanine
4 grams 1,2,4-trichloro-3-phenoxy-copper phthalocyanine
Stir 1 hour at room temperature and then add:
16 grams sodium metal, slowly
4 milliliters pyridine dissolved in 40 milliliters CH₃OH The pyridine is added dropwise whilst adding the sodium metal. Stir ½ hour at room temperature after the last addition of sodium and pyridine. Finally reflux 8 hours. The product is isolated and after-treated in the manner of Example 7. The yield was 308 grams pigmentary beta-copper phthalocyanine.

EXAMPLE 25

To 280 grams CH₃OH add:
0.9 grams dimethylglyoxime
When a solution has been obtained add:
6.2 grams cuprous chloride
Stir till the dark brown complex formation is complete and then add:
32 grams phthalonitrile (95% pure)
3 grams ammonium chloride
45 grams pigmentary beta-copper phthalocyanine
1 gram

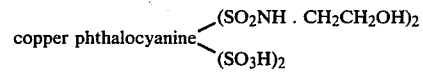

Stir 1 hour at room temperature and then add:
4 grams sodium metal, slowly
1 milliliter pyridine dissolved in 10 milliliters CH₃OH The pyridine is added dropwise, whilst adding the sodium metal. Stir ½ hour at room temperature after the last addition of sodium and pyridine. Finally reflux 8 hours. Allow to cool to room temperature and then add:
60 grams concentrated (98%) H₂SO₄, dropwise Stir 1 hour at room temperature and then reflux ½ hour. The product is isolated and purified in the manner of Example 8. The yield was 77 grams of pigmentary beta-copper phthalocyanine.

EXAMPLE 26

To 1050 milliliters CH₃OH add:
2.7 grams dimethylglyoxime
When a solution has been obtained add:
18.6 grams cuprous chloride
Stir till the dark brown complex formation is complete and then add:
96 grams phthalonitrile (95% pure)
9 grams ammonium chloride
3 grams 1,2,4-trichloro-3-phenoxy-copper phthalocyanine
135 grams pigmentary beta-copper phthalocyanine
Stir 1 hour at room temperature and then add:
12 grams sodium metal, slowly
3 grams pyridine dissolved in 30 milliliters CH₃OH The pyridine is added dropwise, whilst adding the sodium metal. Stir ½ hour at room temperature after the last addition of sodium and pyridine. Finally reflux 8 hours. Allow to cool to room temperature and then add:
180 grams concentrated (98%) H₂SO₄, dropwise Stir 1 hour at room temperature and then reflux ½ hour. The product is isolated and after-treated in the manner of Example 8. The yield was 228 grams pigmentary beta-copper phthalocyanine.

EXAMPLE 27

To a 500 milliliter flask add:
150 milliliters ethylene glycol
32.7 grams phthalodinitrile (98%)
0.9 grams dimethylglyoxime
3.0 grams ammonium chloride
8.8 grams cupric chloride
Then add dropwise over 30 minutes:
80 milliliters of a 25% solution of sodium methoxide in CH₃OH After the addition of sodim methoxide add 1.5 grams pigmentary mono-chloro-copper phthalocyanine. Finally raise the temperature to reflux and reflux 8 hours. After refluxing for 8 hours, filter, wash with methanol and then water. The pigment is purified in the manner of Example 7. The yield was 18 grams of pigmentary alpha copper phthalocyanine.

EXAMPLE 28

By following a similar procedure to that described in Example 27 but using 4 grams ammonium acetate in place of the ammonium chloride there used, 20 grams of pigmentary alpha copper phthalocyanine were obtained.

EXAMPLE 29

To a 500 milliliter flask add:
100 milliliters methanol
32.7 grams phthalodinitrile (98%)
0.9 grams dimethylglyoxime
3.0 grams ammonium chloride
2.0 grams triethanolamine
8.8 grams cupric chloride
Then add dropwise over 30 minutes:
80 milliliters of a 25% solution of sodium methoxide in CH₃OH After the addition of sodium methoxide add 1.5 grams pigmentary mono-chloro-copper phthalocyanine. Finally raise the temperature to reflux and reflux 8 hours. After reflux, filter, wash with methanol and then water. The pigment is purified in the manner of Example 7 to give 28 grams of pigmentary alpha copper phthalocyanine.

EXAMPLE 30

To a 1 liter flask add:
150 milliliters methanol
34.3 grams phthalodinitrile (98%)
0.9 grams dimethylglyoxime
6.4 grams cuprous chloride
3.0 grams ammonium chloride
1.0 grams 1,2,3,4 tetrachloro copper phthalocyanine.

10 grams potassium hydroxide pellets are added whilst the suspension is high speed stirred using a Silverson High Speed stirrer. High speed stir for 10 minutes after the last addition of potassium hydroxide. The reaction mixture is then refluxed under moderate agitation for 8 hours. After reflux, filter, wash with methanol and then water. The pigment is purified in the manner of Example 7 to give 26.5 grams of pigmentary alpha copper phthalocyanine.

EXAMPLE 31

To a liter flask add:
150 milliliters methanol
32.7 grams phthalodinitrile (98%)
0.9 grams dimethylglyoxime
3.0 grams ammonium chloride
6.4 grams cuprous chloride
1.0 gram, 1,2,3,4-tetra-chloro-copper phthalocyanine.
Add:
5.5. grams NaOH whilst the reaction mixture is high speed stirred using a Silverson High Speed stirrer. High speed stir for 10 minutes after the last addition of NaOH. The reaction mixture is then refluxed under moderate agitation for 8 hours.

After reflux, filter, wash with methanol and then water. The pigment is purified in the manner of Example 7 to give 30.5 grams pigmentary alpha copper phthalocyanine.

EXAMPLE 32

By following a similar procedure to that described in Example 31 but adding 6.0 grams urea after the addition of ammonium chloride and prior to the addition of cuprous chloride 26 grams of pigmentary alpha copper phthalocyanine were obtained.

EXAMPLE 33

By following a similar procedure to that described in Example 31 but using 6.0 grams ammonium sulphate in place of the ammonium chloride there used, 26.5 grams of pigmentary alpha copper phthalocyanine were obtained.

EXAMPLE 34

By following a similar procedure to that described in Example 31 but adding 1.0 gram sodium dithionite after the addition of ammonium chloride and prior to the addition of cuprous chloride, 28 grams of pigmentary alpha copper phthalocyanine were obtained.

What we claim is:

1. In a process for the production of alpha-copper phthalocyanine pigments which comprises reacting an orthodinitrilo compound of the general formula

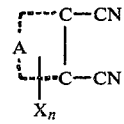

in which A forms an aryl or aromatic heterocyclic radical, X is a hydrogen or halogen atom or a nitro, amino, sulphonic acid, carboxylic acid, alkyl or alkoxy group and n is an integer from 1 to 4; and copper or a copper compound capable of providing the central metal atom of a phthalocyanine pigment at a temperature below 100° C. in the presence of an alkaline substance which is a hydroxide, oxide, peroxide, alkoxide or carbonate of an alkali metal or of an alkaline earth metal in a hydrophilic aliphatic organic solvent containing one or more hyroxy groups wherein the improvement whereby high quality pigments are obtained without need for acid-pasting or mechanical pulverization comprises adding as crystal form controller from the beginning of the reaction
 (a) 0.5% to 40% of an alpha-phase copper phthalocyanine pigment by weight based on the weight of pigment synthesized, or
 (b) 0.5% to 10% of a copper phthalocyanine derivative selected from the group consisting of chlorinated copper phthalocyanine, copper phthalocyanine sulfonic acid, 1,2,4-trichloro-3-phenoxy copper phthalocyanine or

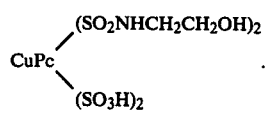

2. In a process for the production of beta-copper phthalocyanine pigments which comprises reacting an orthodinitrile compound of the general formula

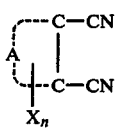

in which A forms an aryl or aromatic heterocyclic radical, X is a hydrogen or halogen atom or a nitro, amino, sulphonic acid, carboxylic acid, alkyl or alkoxy group and n is an integer from 1 to 4; and copper or a copper compound capable of providing the central metal atom of a phthalocyanine pigment at a temperature below 100° C. in the presence of an alkaline substance which is a hydroxide, oxide, peroxide, alkoxide or carbonate of an alkali metal or of an alkaline earth metal in a hydrophilic aliphatic organic solvent containing one or more hydroxy groups wherein the improvement whereby high quality pigments are obtained without need for acid-pasting or mechanical pulverization comprises adding as crystal form controller from the beginning of the reaction 40% to 150% of a beta-phase copper phthalocyanine pigment by weight based on the weight of pigment synthesized.

3. In a process for the production of gamma-copper phthalocyanine pigments which comprises reacting an orthodinitrilo compound of the general formula

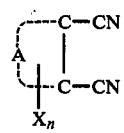

in which A forms an aryl or aromatic heterocyclic radical, X is a hydrogen or halogen atom or a nitro, amino, sulphonic acid, carboxylic acid, alkyl or alkoxy group and n is an integer from 1 to 4; and copper or a copper compound capable of providing the central metal atom of a phthalocyanine pigment at a temperature below 100° C. in the presence of an alkaline substance which is a hydroxide, oxide, peroxide, alkoxide or carbonate of an alkali metal or of an alkaline earth metal in a hydrophilic aliphatic organic solvent containing one or more hydroxy groups wherein the improvement whereby high quality pigments are obtained without need for acid-pasting or mechanical pulverization comprises adding as crystal form controller from the beginning of the reaction 0.5% to 40% of a gamma-phase copper phthalocyanine pigment by weight based on the weight of pigment synthesized.

4. A process as claimed in claim 1 in which the alpha copper phthalocyanine is added in an amount of from 0.5% to 20% by weight based on the weight of pigment synthesised.

5. A process as claimed in claim 3 in which the gamma copper phthalocyanine is added in an amount from 20% to 40% by weight based on the weight of pigment synthesised.

6. A process as claimed in claim 2 in which the beta copper phthalocyanine is added in an amount from 100% to 150% by weight based on the weight of pigment synthesised.

7. A process as claimed in claim 1 in which the copper phthalocyanine derivative (b) is added in an amount from 1% to 7% by weight based on the weight of alpha pigment synthesised.

* * * * *